United States Patent [19]

Murayama et al.

[11] Patent Number: 4,797,943
[45] Date of Patent: Jan. 10, 1989

[54] GRADATION DATA PROCESSING APPARATUS

[75] Inventors: Noboru Murayama, Machida; Hiroshi Shimura, Kawasaki, both of Japan

[73] Assignee: Ricoh Company, Ltd., Japan

[21] Appl. No.: 933,021

[22] Filed: Nov. 20, 1986

[30] Foreign Application Priority Data

Nov. 29, 1985 [JP] Japan .................................. 60-268927
Nov. 30, 1985 [JP] Japan .................................. 60-270212

[51] Int. Cl.⁴ .............................................. G06k 9/40
[52] U.S. Cl. ........................................ 382/54; 382/50; 382/52; 382/53; 358/282; 358/284
[58] Field of Search ............... 358/282, 283, 284, 288; 382/50, 52, 53, 54, 56

[56] References Cited

U.S. PATENT DOCUMENTS

| | | | |
|---|---|---|---|
| 4,205,341 | 5/1980 | Mitsuya et al. | 358/284 |
| 4,554,593 | 11/1985 | Fox et al. | 382/50 |
| 4,575,768 | 3/1986 | Sakai et al. | 358/282 |
| 4,667,249 | 5/1987 | Owada et al. | 358/282 |

Primary Examiner—Leo H. Boudreau
Assistant Examiner—Jose L. Couso
Attorney, Agent, or Firm—Mason, Fenwick & Lawrence

[57] ABSTRACT

A gradation data procesing apparatus comprising,
an extractor for extracting a gradation data corresponding to first small region of an original image distributed in a 2-dimension and a gradation data corresponding to a second small region in adjacent with said first small region,
a detector for detecting whether a difference between a content of the gradation data corresponding to the first small region and a content of the gradation data corresponding to the second small region in adjacent with said first small region is within a predetermined range or not, and
a generator for generating a data indicating a maximum value in a gradation if said difference exceeds an upper value of the range, while generating a data indicating a minimum value in the gradation if said difference goes below a lower value of the range as an output gradation data.

13 Claims, 12 Drawing Sheets

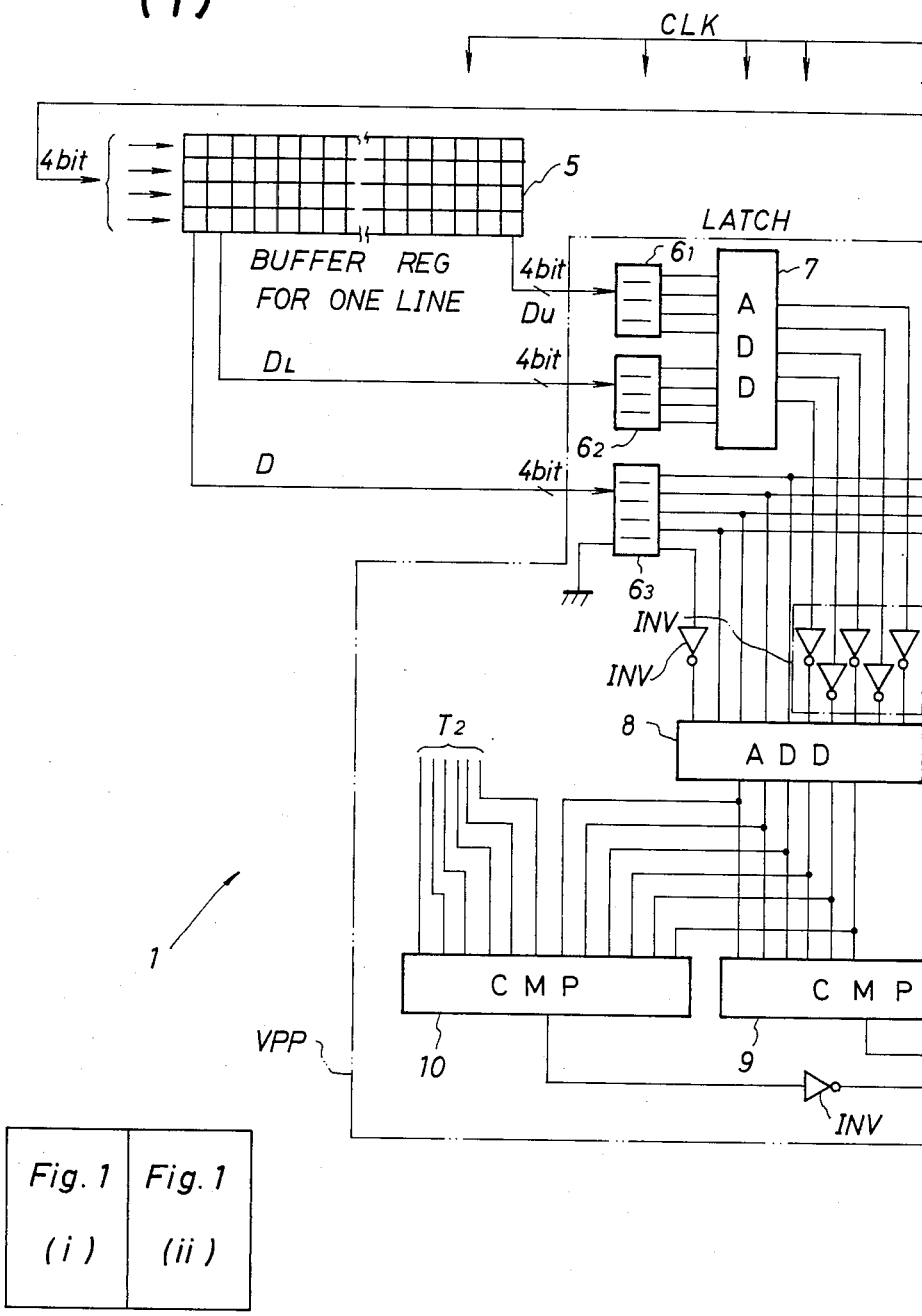

Fig.1 (ii)
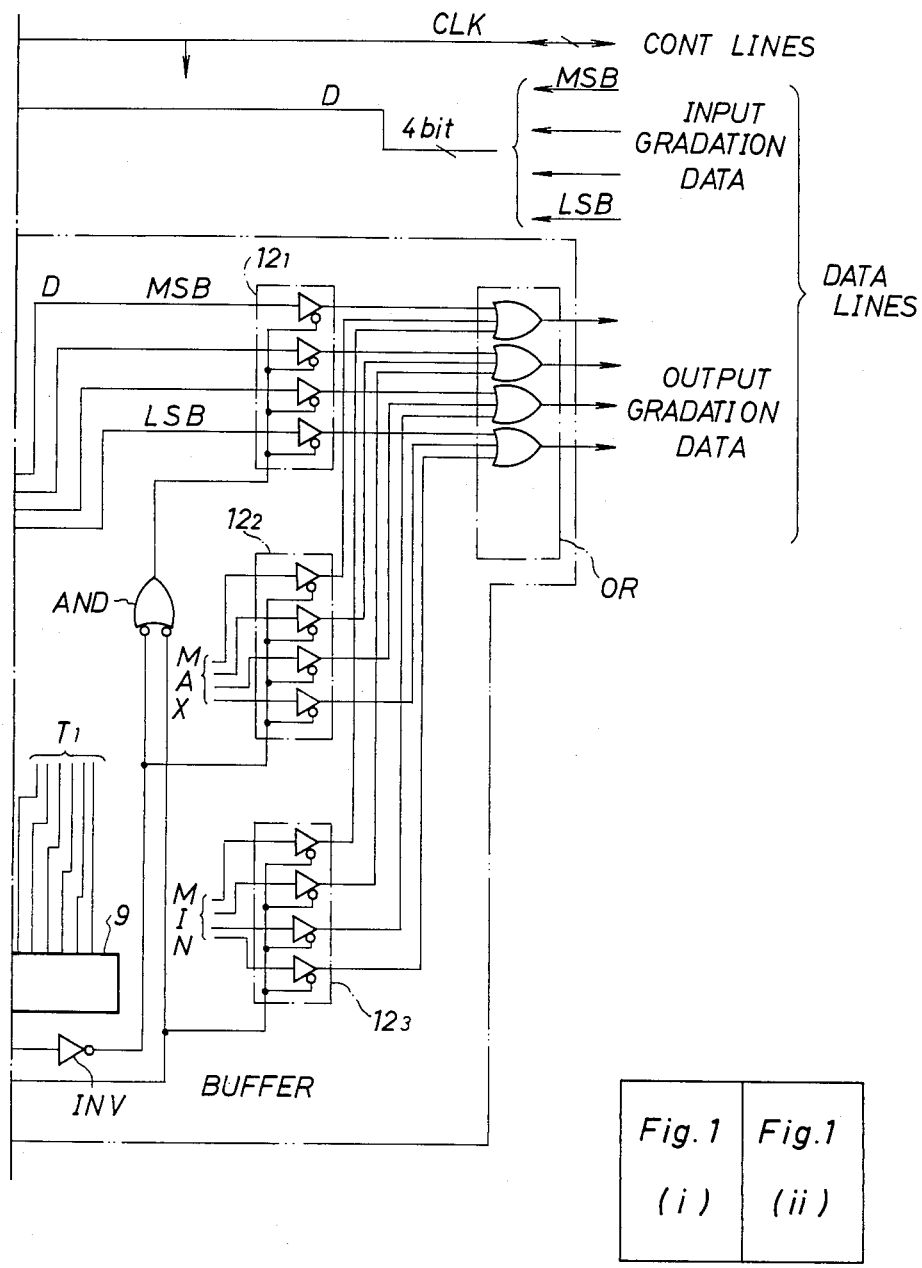

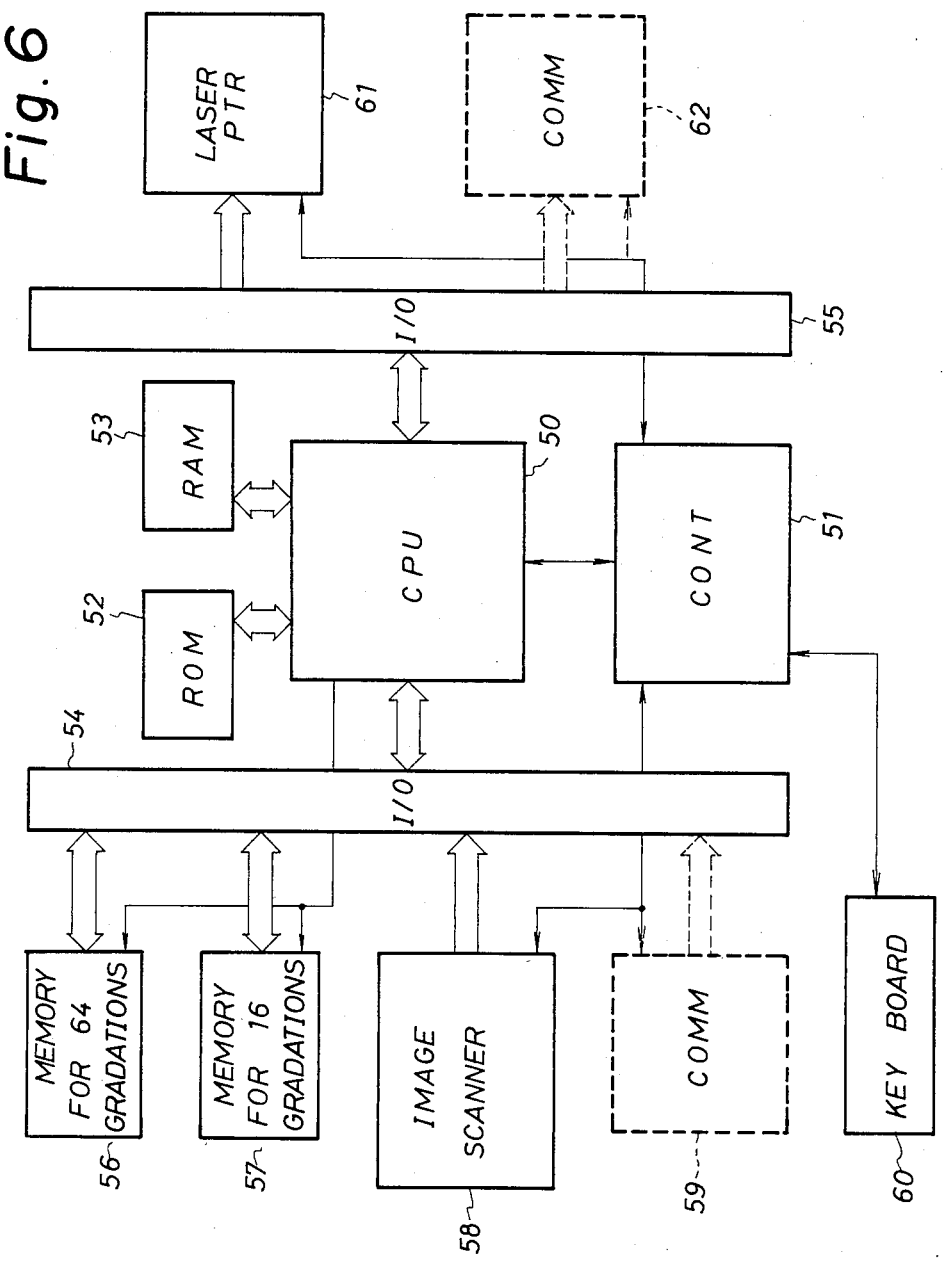

Fig. 8

| | 0₁ | 0₂ | 0₃ | 0₄ | | 0ₘ₋₁ | 0ₘ |
|---|---|---|---|---|---|---|---|
| 1₀ | 1₁ | 1₂ | 1₃ | 1₄ | | | 1ₘ |
| 2₀ | 2₁ | 2₂ | 2₃ | 2₄ | | | 2ₘ |
| 3₀ | 3₁ | 3₂ | 3₃ | 3₄ | | | 3ₘ |

(i)

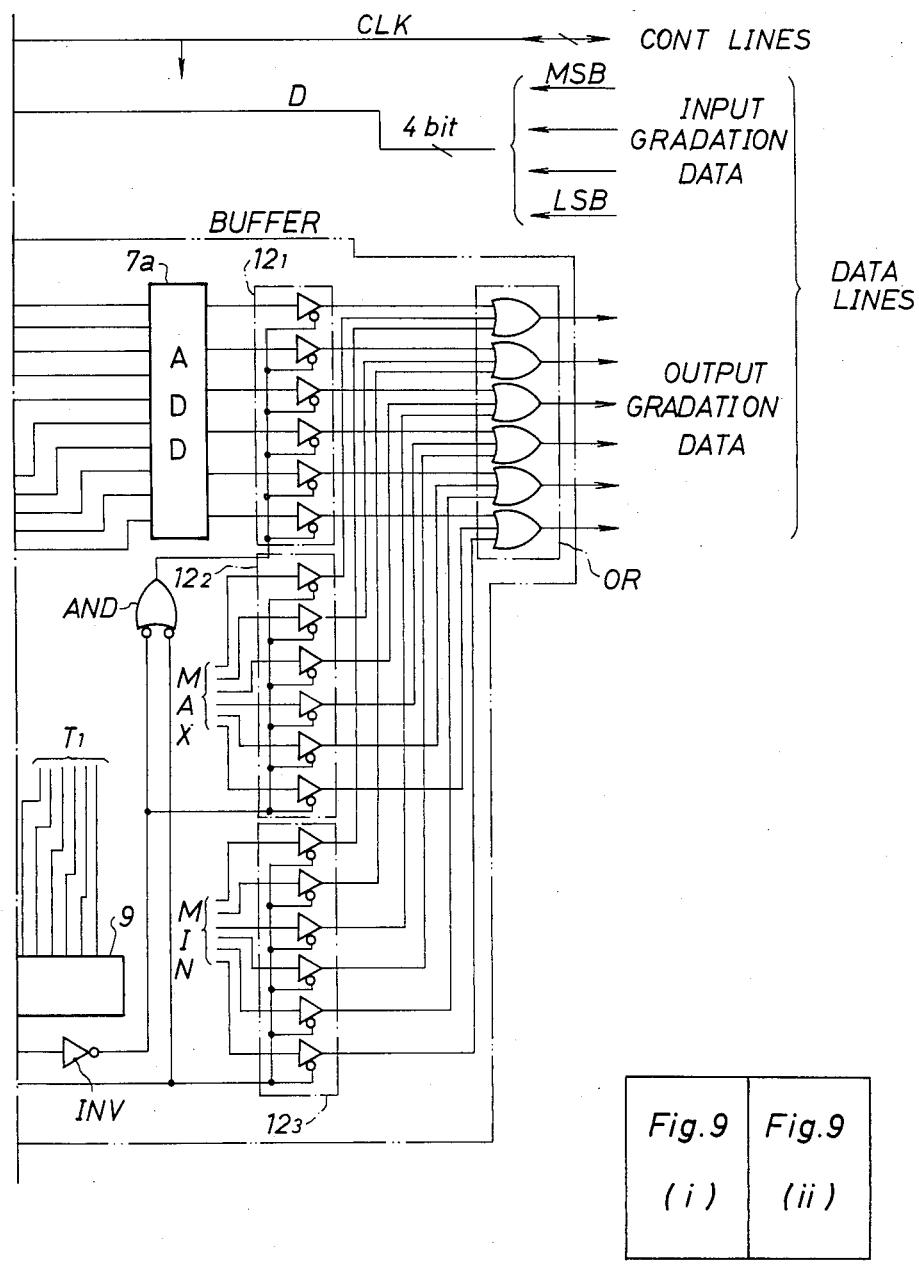
Fig. 9 (ii)

GRADATION DATA PROCESSING APPARATUS

BACKGROUND OF THE INVENTION

1. Field of the Invention

This invention concerns gradation data processing apparatus suitable for use in digital copying equipment or the like in which an image on an original document is read photoelectrically, electric image signals obtained by the reading are converted into electric digital signals and the image is printed on a sheet or the like based on the thus converted electric digital signals.

2. Description of the Prior Art

In known digital copying equipment example, where an original document is read at a resolution of $300 \times 300$ dot/inch$^2$ (an image element with a minimum area to be read is referred to as a picture element), the density of the thus read picture element is classified into 16 steps or gradations (for example, the density is classified equally from the white level to the black level into 16 digital words of steps) thereby forming 16 gradation data composed, for example of 4 bits. An intermediate tone or halftone image processing such as the dither method, the density pattern method or the submatrix method is applied to the gradation data to prepare binary data and a copy of the original image is prepared in a recorded/non-recorded pattern depending on the binary data. In the copying equipment of this kind, since an importance is attached to the reproducibility of an original image with the halftone continuously varying from the white level to the black level such as of photograph and picture, the contour becomes blurred in the copy of the binary image such as of letter or symbol and the resolution is degraded. While on the other hand, in a digital copying equipment adapted to compare an amplitude of the read out signal corresponding to the density of the picture element of the original with a predetermined threshold value, form a binary data depending on the comparison and prepare a copy of the original document in a recorded/non-recorded pattern in accordance with the binary data, although the resolution of the binary image in the copy is increased, it is impossible to express the density of the halftone image resulting in such an image extremely difficult to see.

As a countermeasure for such a disadvantage, there has been a digital copying equipment adapted to change the binarizing treatment for the gradation data according to the case of preparing a copy of a halftone image such as of photograph and picture and the case of preparing a copy of a binary image such as of letter and symbol. In this equipment, an operator designates the binarizing processing by the former (binarization by means of halftone image processing) upon preparing a copy from an original document having a halftone image, while designates the binarizing processing by the latter (binarization by the comparison with a predetermined threshold value) upon preparing a copy of an original document having a binary image.

However, in ordinary cases, most original documents can not clearly be distinguished as the original of halftone image or the original of binary image, but halftone image and binary image are present mixed on the original image, which is called a free format image. Accordingly, in the case of preparing a copy of such a free format image original, the operator selects the binarizing treatment depending on whether the reproducibility in the halftone image or the resolution in the binary image is considered more important in the copy. In this case, degradation in the resolution of the binary image or the reproducibility in the halftone image inevitably results in the copy of the free format image original.

Further, in copying equipment of this kind, since the continuous change in the density of the halftone image in the original such as of photograph or picture can be given only as the density change classified into 16 steps, discontinuous stepwise change in the density inevitably results in the copied image.

For instance, if a photograph of a portrait is copied by such an equipment, an unnatural map pattern appears in the contour of the face making it difficult to see the copy. The map pattern results because the density change, which is continuous in the original document, is expressed stepwise and, accordingly, it becomes less conspicuous by using the gradation data with more gradation number such as 32 gradations or 64 gradations.

By the way, an original document is usually read by using an array of photoelectronic conversion elements such as CCD that converts the intensity of light into electric signals. That is, the original document is illuminated by a lamp and the reflected light is received by each of the photoelectronic elements to obtain electric signals indicating the density of each of the picture elements. However, since the photoelectronic conversion element array has different characteristics in each cell thereof and the illumination by the lamp per se is not uniform, electric signals obtained from the respective cells are different even upon reading an original document of identical density and the error may sometime reach about $\pm 25\%$ of the value between the black and white levels. The gradation data of a greater gradation number suffers greater effect of the error. A photoelectronic conversion element array with less error shows poor yield, whereas use of a photoelectronic conversion element array with large error for improving the yield will require accurate detection and strict compensation for the error. However, this generally requires very complicated procedures. Accordingly, gradation data of 16 gradations have generally been obtained so far from the photoelectronic element array of this kind.

As has been described above, although the quality of the reproduced image for the halftone image can be greatly improved by using gradation data composed of 64 gradations than the gradation data made up of 16 gradations and, in addition, those printers capable of sufficiently printing the image in the 64 gradations (for example, laser printer) have been put to practical use. Image processing has mostly been carried out with the gradation data of 16 gradations and gradation data of 64 gradations are seldom used actually. In view of the above, a demand exists for expanding the gradation data, for example, 16 gradations into data of 64 gradations.

Thus, it is a primary object of the present invention to provide a gradation data processing apparatus capable of improving the resolution for a binary image as much as possible without degrading the reproducibility of a halftone image.

Another object of this invention is to provide an apparatus capable of improving the resolution of a binary image represented by black or white such as letter or symbol and, particularly, an apparatus capable of improving the resolution of a binary image in a so-called free format image in which binary images and halftone images such as photograph and picture are present together.

A further object of this invention is to provide an apparatus for converting the gradation data of a small gradation number into the gradation data of a large gradation number capable of reproducing an image with smooth gradation.

A specific object of this invention is to provide an apparatus for converting gradation data in accordance with a first gradation classification (for example, 4 bit data prepared by dividing the density into 16 gradations: hereinafter referred to as the original gradation data) into gradation data in accordance with a second gradation classification, an order of which is higher than the first gradation classification (for instance, 6 bit data prepared by dividing the density into 64 gradations: hereinafter referred to as expanded gradation data), on the respective image data obtained from small regions in a 2-dimensional distribution image.

This invention provides a gradation data processing apparatus comprising means for extracting gradation data corresponding to a first small region of an original image in a x-y 2-dimensional distribution respectively and gradation data corresponding to a second small region adjacent with the first small region, means for detecting whether the deviation between the content of the gradation data corresponding to the first small region and the content of the gradation data corresponding to the second adjacent small region is within a predetermined range or not, and means for generating data indicating a maximum value if the deviation exceeds the upper value of the range, while generating data indicating a minimum value if the deviation goes below the lower value of the range.

With such a constitution, since the data indicating the maximum value is generated if the deviation between the content of the gradation data corresponding to the noted small region and the content of the gradation data corresponding to the small adjacent region, the noted small region exceeds the upper value of the range, and the data indicating the minimum value is generated if the deviation goes beyong the lower value of the range, even if the gradation data are binarized by the halftone image processing as described above, the resolution of the binary image is increased because the maximum value represents the data to be recorded while the minimum value represents the data not to be recorded.

This invention also provides a gradation data processing apparatus comprising means for extracting the gradation data corresponding to a small region of an image in x-y 2-dimensional distribution and the gradation data corresponding to the small region in adjacent with the noted small region, and means for conducting addition through a weighting factor to the extracted gradation data thereby obtaining gradation data made up of a greater number of bits per word than that of the original gradation data.

With such a constitution, since the original gradation data corresponding to the noted small region and the original gradation data corresponding to the adjacent small region are applied with the weighting factor to obtain expended gradation data, it is possible to reproduce an image with the smooth density change inherent to the halftone image such as photograph and picture and also possible to form expanded gradation data due to the higher gradation classification from the original gradation data of lower gradation classification.

In a preferred embodiment according to this invention, the deviation is defined as a value obtained by subtracting, from the doubled value for the content of the gradation data corresponding to the noted small region, the value for the content of the gradation data corresponding to the small region adjacent to the noted small region in the direction y, and the value for the content of the gradation data corresponding to the small region adjacent to the noted small region in the direction x. Output means issues the gradation data corresponding to the noted small region if the deviation is within a predetermined range, the data indicating the maximum value if the deviation exceeds the upper value of the range and the data indicating the minimum value if the deviation goes below the lower value of the range respectively.

Specifically, the deviation is defined as $\delta$ represented by the equation:

$$\delta = 2 \times D - (D_L + Du) \quad (1)$$

where D represents the content for the gradation data corresponded to the noted small region, Du represents the content of the gradation data corresponded to the small region adjacent to the noted small region in the y direction and $D_L$ represents the content of the gradation data corresponded to the small region adjacent to the noted small region in the x direction. The generating means generates the value D if the deviation $\delta$ is between a first threshold value $T_1$ and a second threshold value $T_2$ ($T_1 \geq \delta \geq T_2$), generates the maximum value MAX (for example, the gradation 15 in 16 gradations) if the deviation $\delta$ exceeds the first threshold value $T_1$ ($\delta > T_1$) and the minimum value MIN (for example, the gradation 0 in the 16 gradations) if the deviation $\delta$ is lower than the second threshold value $T_2$ ($\delta < T_2$) respectively as the gradation data.

Referring more specifically, since the density change in a halftone image is continuous, the density difference between the adjacent small regions on the original is extremely small, whereas since the density change in a binary image is discontinuous, there is a portion where the density difference between the adjacent small regions is extremely large. This portion is referred to as a contour. By emphasizing the density difference at the contour, the discontinuity in the density change of the binary image can be made distinct to improve the resolution.

Accordingly, in this case, the contours of the binary image is stressed and the resolution can be improved by using the maximum value MAX if the deviation $\delta$ is greater than $b = T_1$ and the minimum value MIN if the deviation $\delta$ is smaller than $-b = T_2$ as the gradation data.

In another preferred embodiment, the weighting factor is effected by adding the doubled value for the content of the original gradation data (16 gradations) corresponding to a noted small region, the value for the content of the original gradation data (16 gradation) corresponding to a small region adjacent the noted small region in the y direction and the value for the content of the original gradation data (16 gradations) corresponding to a small region adjacent to the noted small region in the x direction. That is, expanded gradation data (64 gradations) are defined as D' represented by the following equation:

$$D' = 2 \times D + (D_L + Du) \quad (2)$$

where D represents the content of the original gradation data corresponding to the noted small region, Du represents the content of the original gradation data corresponding to the small region adjacent to the noted small region in the y direction and $D_L$ represents the content of the gradation data corresponding to the small region adjacent to the noted small region in the x direction. In this embodiment, since the expanded gradation data are determined while considering the density change of the image in the x and y directions, a reproduction of a smooth density change inherent to the halftone image can be realized by the expanded gradation data. That is, expanded gradation data of 64 gradations, which is capable of reproducing an image with excellent quality, can be formed with ease from the original gradation data of 16 gradations which are generally used frequently and can be prepared comparatively readily.

By the way, it is desired that the binary image (such as a letter) can clearly be distinguished on the boundary between the portion with the black and the portion without the black. However, since the processing represented by the formula (2) blurs the boundary portion as natural as possible, resolution for the binary image is degraded.

Accordingly, the edge or contours of the binary image can be emphasized in copying by setting the maximum value of the expanded gradation data with no expansion processing according to the equation (2) if the value $\delta$ of the equation (1) represented by: $2D-(D_L+Du)$ is greater than b, while setting the minimum value of the expended gradation data with no expansion processing according to the equation (2) if the value $\delta$ is smaller than $-b$.

In view of the above, in the preferred embodiment, the edge of a binary image (such as a letter) is emphasized and the resolution is improved by setting the maximum value that is, value 63 in the gradation data, of 64 gradations if $\delta < T_1$, where $T_1$ is the first threshold value, as the expanded gradation data while setting the minimum value that is, value 0 in the gradation data of 64 gradations if $\delta > T_2$, where $T_2$ is the second threshold value, as the expended gradation data.

These and other objects, as well as features of this invention will become apparent from the following descriptions for preferred embodiments while referring to the accompanying drawings, wherein FIGS. 1(i) and 1(ii) show the electrical circuit of one embodiment according to this invention;

FIG. 4b shows the flow of signals in the equipment of FIG. 4a;

FIG. 5 shows one example of an image editing processing carried out by the equipment shown in FIG. 4a;

FIG. 6 shows a block circuit diagram of another embodiment according to this invention;

FIG. 8 shows the state of frame memory after pretreatment;

Figure 9:
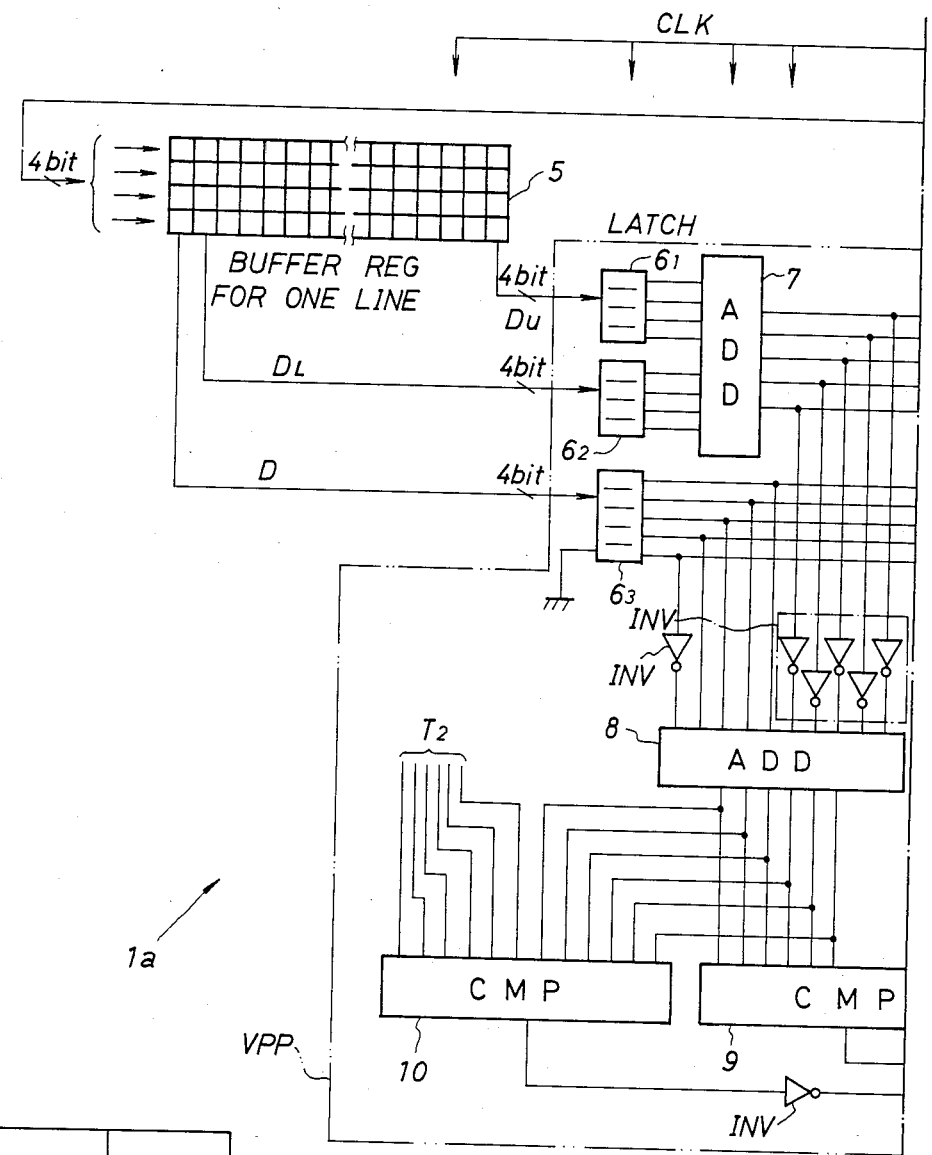
Figure 10:
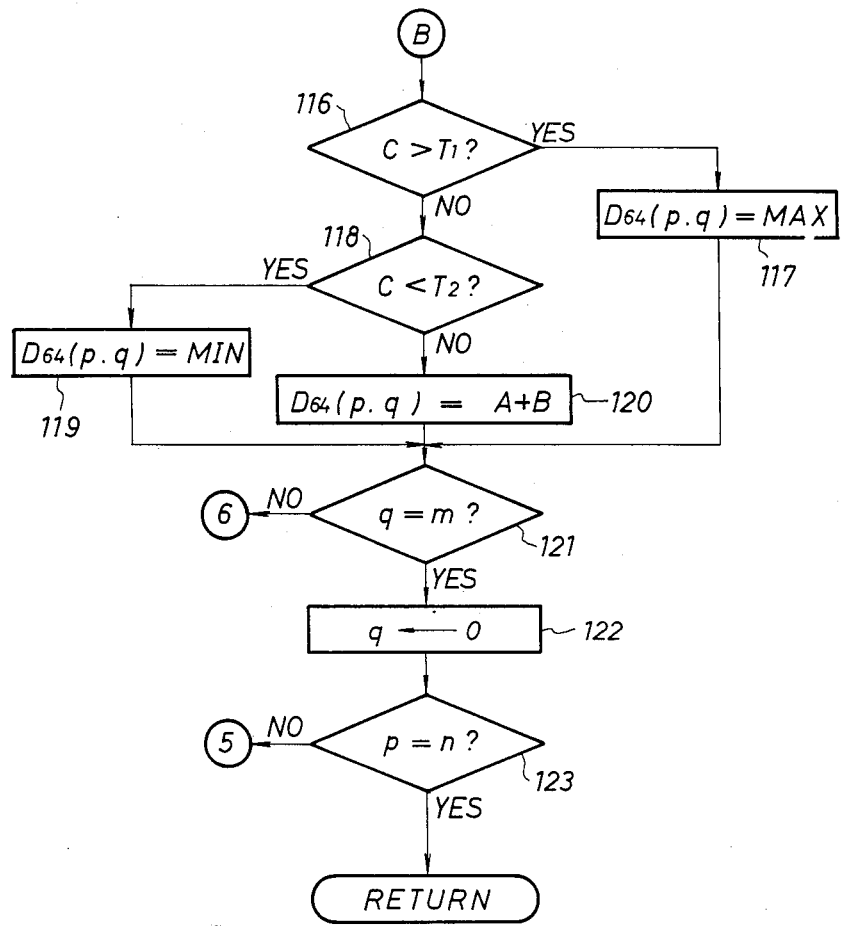

FIGS. 9(i) and 9(ii) show an electrical circuit diagram of another embodiment according to this invention and FIG. 10 is a flow chart for the operation in the case where the embodiment shown in FIG. 9 is embodied by using CPU shown in FIG. 6.

As shown in FIG. 1, gradation data processing device 1 comprises 1-line buffer 5, image processor VPP, etc. The 1-line buffer 5 comprises four shift registers disposed in parallel each having stages for the number of small regions in 1-line on an original plus one. The number of small regions is equal to, for example, the number of picture elements to be read. It can not, however, generally be considered as "small region = picture element" considering the case of conducting the compression for the gradation data, etc. The image processor VPP is formed of a large scale integrated circuit (LSI) comprising latch circuits $6_1$, $6_2$ and $6_3$, binary full adders (hereinafter simply referred to as ADD) 7 and 8, digital comparators (hereinafter referred to as CMP) 9 and 10, control buffers $12_1$, $12_2$ and $12_3$ and "AND" gate AND, "OR"gate OR and inverters INV, etc.

Timing or clock signals CLK on the control lines, control the shift operation for the 1-line buffer 5 and the input/output operation of the image processing processor VPP.

Then, equation (1) will be explained referring to FIGS. 2a, 2b, 2c and 2d. In these figures, the solid line represents a small region with a black image while the broken line represents a small region with a white image, in which the content of the gradation data corresponding to the small regions with the black image is assumed as b (0>b), whereas the content of the gradation data corresponding to the small regions with white image is as zero.

Figure 2A:
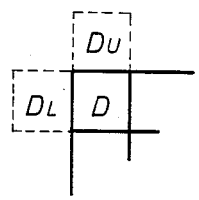
FIGS. 2a, 2b, 2c and 2d show, respectively, the edge portion of a binary image in a 2-dimensional manner.
Figure 2B:
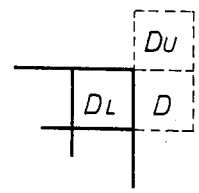
Figure 2C:
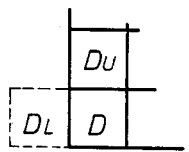
Figure 2D:
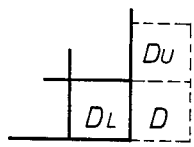

Referring at first to FIG. 2a, the difference corresponding to density difference between the gradation data D corresponding to the noted small region and the gradation data Du corresponding to the small region positioned adjacent to the noted picture element in the y direction is b and the difference between the gradation data D and the gradation data $D_L$ corresponded to a small region positioned adjacent to the noted small region in the x direction is b. That is, the value for the deviation $\delta[=2D-(D_L+Du)]$ is 2b. Referring to FIG. 2b, while the difference between the gradation data D and the gradation data Du is 0, the difference between the gradation data D and the gradation data $D_L$ is b. That is, the value for the deviation $\delta$ is $-b$. Referring to FIG. 2c, while the difference between the gradation data Du and the gradation data D is 0, the difference between the gradation data D and the gradation data $D_L$ is b. That is, the value for the deviation $\delta$ is b. Referring to FIG. 2d, while the difference between the gradation data D and the gradation data Du is 0, the difference between the gradation data D and the gradation data $D_L$ is $-b$. That is, the value for the deviation $\delta$ is $-b$.

The operation of the embodiment shown in FIG. 1 will now be explained while referring to FIGS. 2a-2d. In this case, it is assumed for the sake of convenience that the images of small regions on the original are sequentially read in the manner of the raster scanning from the leftward end thereof line to the rightward end thereof by line and the gradations, data of 16 gradation, which correspond to the thus read images and each of which is a 4 bit parallel digital signal, are supplied to the buffer 5 through the control line.

On each supply of the gradation data, each register of buffer 5 loads the supplied gradation data and shifts the pre-loaded gradation data each by one stage rightwardly. Assuming the number of small regions in 1-line as m, since the buffer 5 has a length m+1, when the gradation data D corresponding to the noted small region are loaded in each of the $(m+1)_{th}$ bits or leftward end stages in the parallel registers, the gradation data $D_L$ corresponding to the small region adjacent to the left of the noted small region are loaded in each of the $m_{th}$ bits and the gradation data Du corresponding to the small region just above the noted small region are loaded in each of the first bits.

The gradation data $D_L$ corresponding to the small region adjacent to the left of the noted region and the gradation data Du corresponding to the small region just above the noted small region are supplied by way of the latch $6_1$ and latch $6_2$ to ADD 7.

The ADD 7 adds the gradation data $D_L$ and Du. That is, the calculation $(D_L+Du)$ in the foregoing equation (1) is performed in the ADD 7. Since each of the gradation data $D_L$ and Du comprises 4 bits in parallel, the output from the ADD 7 comprises 5 bits in parallel. The output terminals of the ADD 7 are connected to ADD 8 by way of the inverters INV which invert the output signal of the ADD 7.

While on the other hand, the gradation data corresponding to the noted small region are supplied by way of the latch $6_3$ to control buffer $12_1$, and further supplied to ADD 8 as the value shifted to the upper digit by one bit, that is, as the calculated value: $2 \times D$ in the equation (1) described above, in which the 5th bit or LSB is inverted by means of the inverter INV. That is, a calculated value $(2 \times D+1)$ is supplied to the ADD 8.

The ADD 8 adds the calculated value $(2 \times D+1)$ and the inverted calculated value $(D_L+Du)$ of the output from the ADD 7. That is, the mathematical operation in the ADD 8 is equal to the addition of the calculated value $2 \times D$ and the complimentary of the calculated value $(D_L+Du)$ in modulo 2, in which the calculation for the equation (1) described above:

$$2 \times D - (D + Du)$$

is conducted, and the deviation δ is obtained on the output of the ADD 8.

The output, that is, the deviation δ from the ADD 8 is a parallel 6 bit word including a sign bit and applied to CMP 9 and 10.

The CMP 9 receives a first threshold value $T_1$ which can properly be set by a manual switch or the like and is set to 2 in decimal notation (000010 in binary notation) in this embodiment. In the CMP 9, the deviation δ is compared with the first threshold value $T_1$, and logic "1" is generated if the deviation δ exceeds the threshold value $T_1$, whereas logic "0" is generated if the deviation δ is smaller than the threshold value $T_1$ from the CMP 9 respectively. The output of the CMP 9 is given by way of an inverter INV to one input of the AND gate AND and the control input of the control buffer $12_2$. The maximum value MAX of 16 gradations, that is, 15 in decimal notation (1111 in binary notation) is supplied to the input of the control buffer $12_2$. The maximum value MAX may properly be set by a manual switch or the like. The CMP 10 receives a second threshold value $T_2$ which can properly be set by a manual switch or the like and is set to value −2 in decimal notation (100010 in binary notation) in this embodiment. In the CMP 10, the deviation δ and the second threshold value $T_2$ are compared, and logic "1" is generated if the value δ is smaller than the threshold value $T_2$, whereas "0" is generated if the deviation δ exceeds the threshold value $T_2$ from the CMP 10 respectively. The output of the CMP 10 is supplied by way of an inverter INV to another input of the "AND" gate AND and also to the control input of control buffer $12_3$. The minimum value MIN of 16 gradation, that is, 0 in decimal notation (0000 in binary notation) is applied to the input of the control buffer $12_3$. The minimum value MIN can properly be set by a manual switch or the like.

The output of the "AND" gate AND is connected to the control input of control buffer assembly 12 made up of control buffers $12_1$, $12_2$ and $12_3$.

Each of the control buffers $12_1$, $12_2$ and $12_3$ transmits an input signal thereof to an output thereof when logic "0" is supplied to an enable input thereof, while inhibiting input signal thereof to transmit to output thereof when logic "1" is supplied to the enable input thereof. Accordingly, since the enable input of buffer $12_1$ is "0" and the enable input of buffers $12_2$ and $12_3$ are "1" when the deviation δ is greater than the threshold value $T_2$ and smaller than the threshold value $T_1$ ($T_1 \geq \delta \geq T_2$), gradation data D corresponding to the noted small region are issued from the "OR" gate OR by way of the buffer $12_1$. When the output of the CMP 9 is "1" and the output of CMP 10 is "0", that is, if the deviation δ exceeds the threshold value $T_1$ ($\delta > T_1$), since the enable input of the buffer $12_2$ is "0" and the enable inputs of the buffers $12_1$ and $12_3$ are "1", the gradation data of the maximum value MAX are issued from the "OR" gate OR by way of the control buffer $12_2$. Further, since the enable input of buffer $12_3$ is "0" and the enable inputs of the buffers $12_1$ and $12_2$ are "1" if the output of the CMP 9 is "0" and the output of the CMP 10 is "1", that is, if the deviation is smaller than the threshold value $T_2$ ($\delta < T_2$), the gradation data of the minimum value MIN are issued from the "OR" gate OR by way of the control buffer $12_3$.

In the embodiment as described above, while the gradation data comprises 16 gradations indicated with the parallel 4 bits, the gradation data processing, for example, for 64 gradation data with 6 bits or that for 256 gradation data with 8 bits can also be executed.

Figure 3:
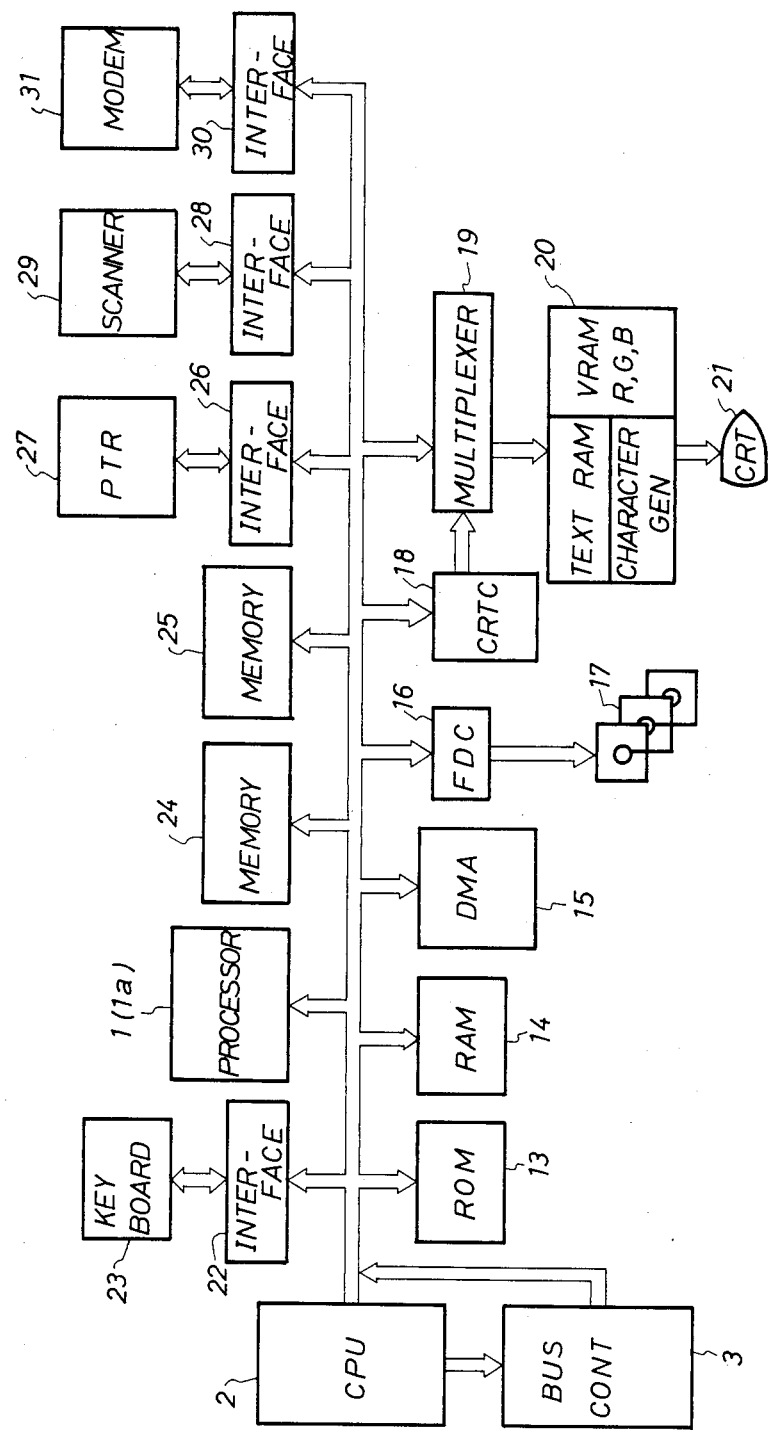
FIG. 3 shows a block circuit diagram of an image processing equipment including the gradation data processing apparatus shown in FIG. 1.

FIG. 3 shows one example of an image processing equipment including the gradation data processing apparatus 1 shown in FIG. 1. Referring to FIG. 3, the image processing equipment comprises microprocessor (CPU) 2, bus controller 3, ROM 13, RAM 14, DMA 15, floppy disc controller (FDC) 16, floppy disk 17, CRT controller (CRTC) 18, multiplexer 19, CRT driver 20, CRT 21, gradation data processing device 1, frame memory 24 for 16 gradations, frame memory 25 for 64 gradation, printer 27, scanner 29, communication MODEM 31 and the like. They are connected by way of interfaces 22, 26, 28 and 30. The CPU 2 controls the equipment by the dialog with an operator through the key board 23 and properly determines the flow of data such as, for example, scanner 29→gradation data processing apparatus 1→printer 17 (frame memories 24, 25, MODEM 31, CRT 21), modem 31→gradation data processing apparatus 1→printer 27 (frame memory 24, 25, MODEM 31, CRT 21) and performs the image processing.

Figure 4B:
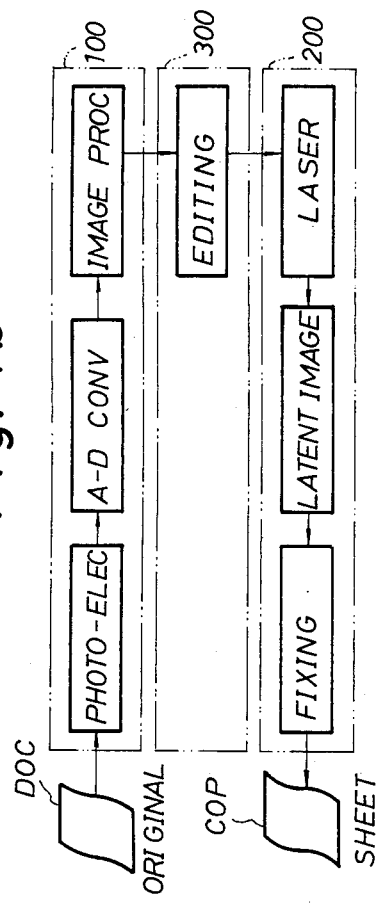
Figure 4A:
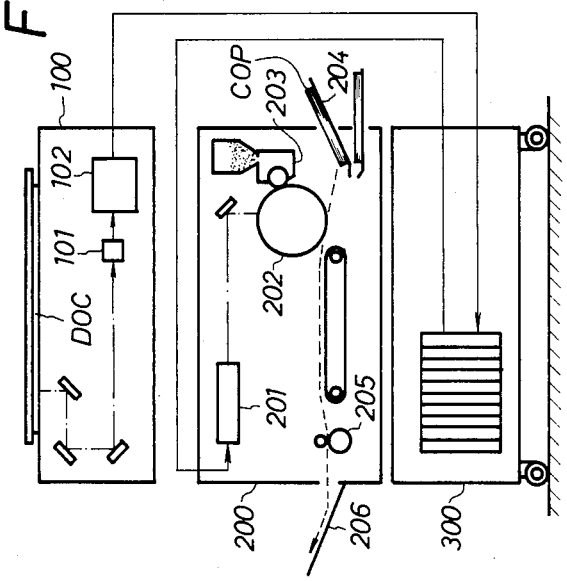
FIG. 4a shows an arrangement of the equipment shown in FIG. 3.

The equipment shown in FIG. 4a comprises scanner unit 100, laser printer unit 200, image editing unit 300 and the like, to which are also connected communication MODEM, CRT and the like. In this case, an optical signal is shown by the dotted chain line, an electrical signal is shown by the solid line and the flow of recording paper is indicated by the broken line.

In the scanner unit 100, which corresponds to the scanner 29 of FIG. 31, light reflection from an original document DOC by the illumination lamp is introduced by way of a mirror to charge coupled device (CCD) 101 to read original DOC. Electric signals indicating the density for each of the picture elements (also referred to as a small region) read in CCD 101 are applied to gradation processing section 102, in which the gradation data of 16 gradations are at first generated. The gradation processing section 102 includes the gradation data processing apparatus 1, in which processing for emphasizing the edge of a binary image is applied and halftone image processing is further applied to convert the signals into binary data, which are applied to the image editing unit 300.

Figure 5:
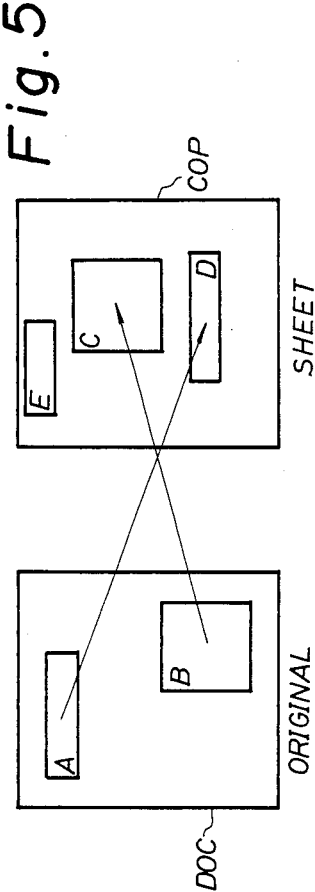

The image editing unit 300 performs image editing by selecting the binary data supplied from the scanner unit 100 and adding a predetermined pattern and transfers them to the laser printer unit 200 The image edition means such a processing as editing the binary data for printing, the image in the region A of the original DOC into the region D of copy COP, the image in the region B of the original DOC into the region C of the copy COP and the predetermined pattern into the region E of the copy COP for example, as shown in FIG. 5. The laser printer unit 200 comprises a laser optical system 201, a laser beam of which is modulated by the binary data after the edition applied from the image editing unit 300, a light sensitive drum 202, on which an electrostatic latent image is formed based the laser beam from system 201, the developing device 203 developing the latent image on the drum 202 passing therethrough a paper feed tray 204 from which a recording or copy sheet is supplied to the drum 202, the developed image on the drum 202 being transferred on the sheet, a fixing device 205 in which the image on the sheet is fixed, and discharge tray 206 to which the sheet is discharged.

FIG. 4b shows the flow of the signals of the unit 100, 200 and 300 described above.

Another embodiment according to this invention will be described with reference to FIG. 6. The system illustrated in FIG. 6 comprises, a system controller 51, input equipment having image scanner 58 and communication apparatus 59 connected by way of I/O interface 54, image processing equipment having CPU 50, frame memories 56 and 57 with a large capacity, and output equipment having laser printer 61 connected by way of I/O interface 55, and communication apparatus 62 (shown in phantom). The system controller 51 controls the system of FIG. 6 under instructions from the key board 60. That is, in this system, the gradation data of the original comprising 16 gradations or 64 gradations read from the image scanner 58, or gradation data comprises 16 gradations or 64 gradations received by way of the communication apparatus 59 are stored in the frame memories 56 and 57 and then applied with the gradation data processing, image editing and the like and then supplied to the laser printer 61 to print out on the sheet or the communication apparatus 62 to transmit to a remote system in accordance with the operator's instruction.

In the processing operation of the CPU 50 of the system shown in FIG. 6, explanation will be made for the similar processing with that by the gradation data processing apparatus of FIG. 1, by referring to FIGS. 7a and 7b. In the descriptions below, the step number is represented by "S—" ("S" is not shown in the drawing), while m represents the number of small regions in the lateral direction of an image, for instance, corresponding to the lateral direction of DOC in FIG. 5 and n represents the number of lines in the longitudinal direction, for example, corresponding to the vertical direction of DOC in FIG. 5. Further, the address of the memories 56 and 57 are represented by (p, q), which corresponds to $q_{th}$ small region on $p_{th}$ line, the value for the p increasing from above to below in the original image, the value for q increasing from the left to the right in the original image, the gradation data of 16 gradations at the address (p, q) of the frame memory 57 are represented by $D_{16}(p, q)$ while the gradation data of 64 gradations at the address (p, q) of the frame memory 56 are represented by $D_{64}(p, q)$. Only the data processing for 16 gradations is shown in the flow chart of the FIG. 7a, 7b.

Figure 7A:
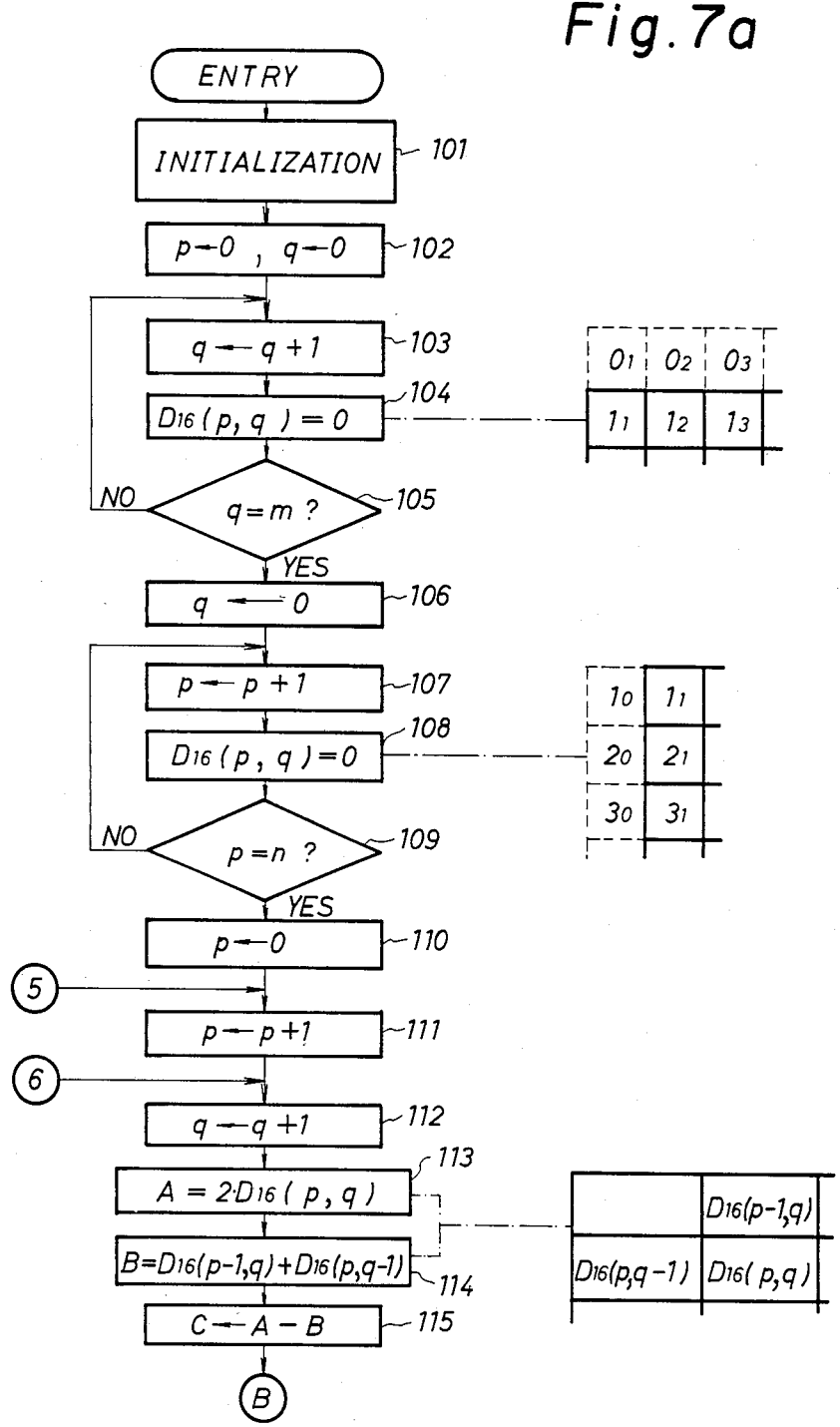
FIGS. 7a and 7b are flow charts of the operation of the CPU shown in FIG. 7.

Referring to FIG. 7a, the memory, the registers A, B, C and the like are initialized at S101.

After setting the values for p and q to 0 at S102, the value for the register q is incremented by 1 at S103, and the data $D_{16}(p, q)$ in the frame memory 57 are set to 0 or the data $D_{64}(p, q)$ in the frame memory 56 are set to 0 at S104. S103 and S104 are repeated till the value of the register q reaches m. That is, since the value of the register p is 0, dummy data (0000) in the case of 16 gradations or dummy data (000000) in the case of 64 gradations respectively corresponding to first small region to $m_{th}$ small region at the $0_{th}$ line are set at shown on the side of S104, in which $1_1, 2_2$, —correspond to $D_{16}(1, 1), D_{16}(2, 1)$, —, or correspond $D_{64}(1, 1), D_{64}(2, 1)$.

When the value of the register q reaches m and the operation leaves the loop of S103 - S104 - S105 - S103 —at S105, the value of the register q is set to 0 at S106, thereafter, the value of the register p is incremented by 1 at S107, and the data $D_{16}(p, q)$ in the frame memory 57 are set to 0 at S108 or the data $D_{64}(p, q)$ in the frame memory 56 are set to 0. S107 and S108 are repeated till the value of the register p reaches n. That is, since the value of the register q is 0, dummy data (0000) in the case of 16 gradations or dummy data (000000) in the case of 64 gradations corresponding to $0_{th}$ small region in first line to $n_{th}$ line as shown on the side of S108.

When the value of the register p reaches n and the operation leaves the loop: S107 - S108 - S109 - S107 —at S109, the value of the register p is set to 0 at S110 (that is, p=0, q=0 in this point).

The foregoing is a pre-treatment and the memory state of the frame memory 57 or the frame memory 56 is as shown in FIG. 8.

The register p is incremented by 1 at S111 and the register q is incremented by 1 at S112.

At S113, a value obtained by doubling the gradation data $D_{16}(p, q)$ or the gradation data $D_{64}(p, q)$ corresponding to the $q_{th}$ small region at $p_{th}$ line read out from the frame memory 57 or 56 is loaded into register A.

At S114, a value prepared by adding the gradation data $D_{16}(p-1, q)$ or the gradation data $D_{64}(p-1, q)$ corresponding to the $q_{th}$ small region, that is, the small region just above the noted small region, in $(p-1)_{th}$ line read from the frame memory 57 or 56 with the gradation data $D_{16}(p, q-1)$ or gradation data $D_{64}(p, q-1)$ corresponding to $(q-1)_{th}$ small region, that is, the small region adjacent to the left of the noted small region, in $p_{th}$ line is loaded to the register B. The 2-dimensional positional relationship between these gradation data are shown on the side of the S113 and the S114. The relationship is the same also in the case of 64 gradations.

At S115, a value prepared by subtracting the value of the register B from the value of the register A is loaded in the register C. That is, the deviation $\delta$ in the equation (1) as described above is loaded as the value of the register C.

Figure 7B:
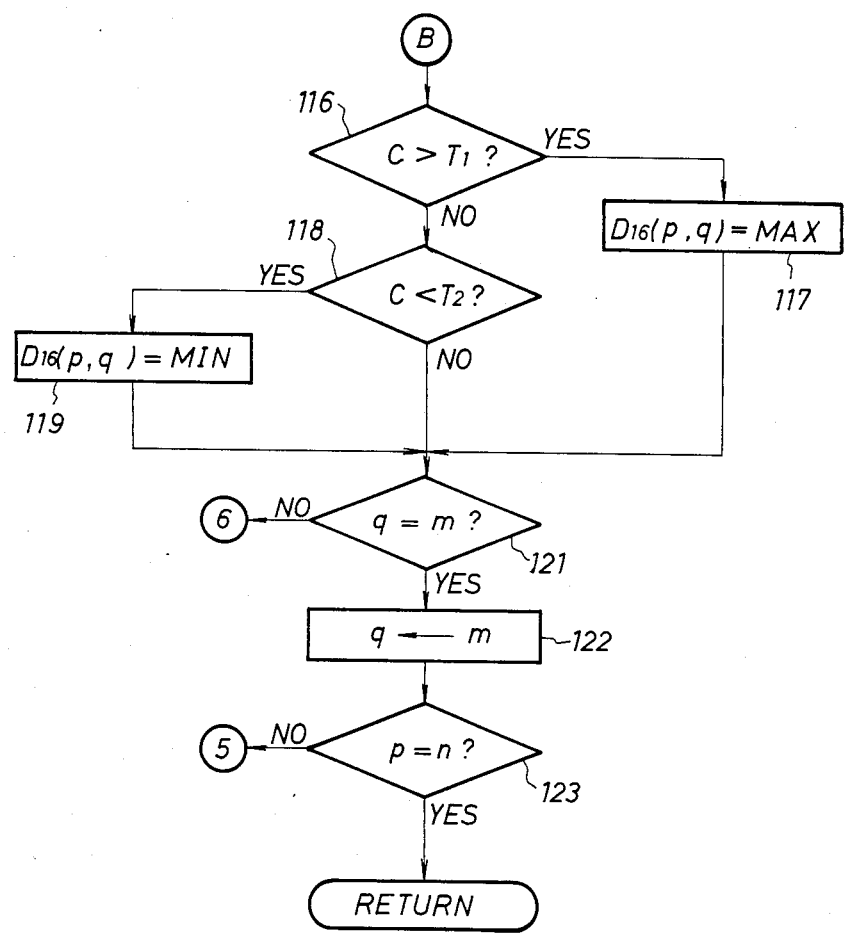

The step then proceeds to FIG. 7b, and the value of the register C, that is, the deviation $\delta$ is compared with the first threshold value $T_1$ at S116. If the deviation $\delta$ exceeds the first threshold value $T_1$ ($\delta > T_1$), the step proceeds to S117 in which the gradation data $D_{16}$ (p, q) or gradation data $D_{64}$ (p, q) are changed to the maximum value MAX and stored in the region of the address (p, q) of the frame memory 57 or 56. In this embodiment, the value of the first shreshold value $T_1$ is set to 2 and the maximum value MAX is set to (1111) or (111111).

In the case where the deviation $\delta$ (value of the C register) is smaller than the first threshold value $T_1$, the step proceeds S118, in which the value $\delta$ is compared with the second threshold value $T_2$. In this case, if the deviation $\delta$ is less than second threshold value $T_2$ ($\delta < T_2$), the step proceeds to S119, in which the gradation data $D_{16}$ (p, q) or gradation data $D_{64}$ (p, q) are changed into the minimum value MIN and stored into the region of the address (p, q) of the frame memory 57 or 56. In this embodiment, the value for the second threshold value $T_2$ is set to $-2$ and the minimum value MIN is set to (0000) or (000000).

At S118, if the deviation $\delta$ stored in the C register is greater than the second threshold value $T_2$, that is, if the deviation $\delta$ is smaller than first threshold value $T_1$ and greater than the second threshold value $T_2$ ($2 \geq \delta \geq -2$), the gradation data $D_{16}$ (p, q) or gradation data $D_{64}$ (p, q) of the memory 56 are not changed.

When the steps proceed from S117, S118 or S119 to S121, the value of the q register is examined. Since the value of the register q is equal to the number of small regions in the lateral direction of the original, if q$\neq$m (q<m), the operation is returned to S112 of the flow shown in FIG. 8a, the register q is incremented by 1, that is, the noted small region is shifted rightwardly by 1 and the foregoing processings are repeated. If q=m, since this means that the processing for the $p_{th}$ line has been ended, the value of the register q is set to 0 at S122 and the value of the register p is examined at S123. Since the value of the register p is equal to the number of lines in the vertical direction of the original, if p$\neq$n (p<n), the step returns to S111 of the flow shown in FIG. 8a and the register p is incremented by 1, that is, shifted downwardly by one line and the foregoing processings are repeated from the leftward end small region. If p=n, since this means that the entire processing for the image has been ended, the operation is returned to the main routine not illustrated.

Another embodiment according to the teachings of the present invention will be explained with reference to FIG. 9.

The embodiment shown in FIG. 9 is substantially identical to the embodiment shown in FIG. 1 except that binary adder 7a is disposed between ADD 7a, latches $6_3$ and control buffer $12_1$, 5 bits from adder 7 and 5 bits from the latch $6_3$ are supplied to the adder 7a, 6 bits signals issued from the adder 7a are supplied to the buffer $12_1$, and control buffer $12_1$, $12_2$ and $12_3$, and "OR" gate OR are equipped with 6 bit structures respectively.

That is, in the device 1a shown in FIG. 9, the output terminals of the ADD 7 are connected directly to the input terminals of the ADD 7a, while branched and connected by way of inverters INV to the ADD 8. The output terminals from the latch $6_3$ are connected directly to the input terminals of the ADD 7a and branched and connected by way of inverter only for LSB to the ADD 8.

In the ADD 7a, the output from the ADD 7, that is, ($D_L+Du$) and the output from the latch $6_3$, that is, $2 \times D$ are added. Since both of the output from the ADD 7 and the output from the latch $6_3$ are 5 bits, the output from the ADD 7a comprises 6 bit. That is, in the ADD 7a, the calculation for the equation (2) as described above:

$$D' = 2 \times D + (D_L + Du)$$

is performed, by which he expanded gradation data of 64 gradations are generated from the output terminals of the ADD 7a.

The maximum value MAX of 64 gradations, that is, 63 in the decimal notation (111111 in the binary notation) is given to the input of the control buffer $12_2$.

The minimum value MIN of 64 gradations, that is, 0 in the decimal notation (000000 in the binary notation) is given to the input of the control buffer $12_3$.

The apparatus 1a shown in FIG. 9 generates the expanded gradation data (6 bit) of 64 gradations comprising parallel 6 bits on every input of the original gradation data of 16 gradations comprising parallel 4 bits. The operation will now be explained below. If the output from CMP 9 and CMP 10 are 0, that is, if the value $\delta$ is greater than the threshold value $T_2$ and smaller than the threshold value $T_1$ ($T_1 \geq \delta \geq T_2$), the output from the ADD 7a, that is, the expanded gradation data according to the equation (2) is issued by way of the control buffer $12_1$ and the OR gate OR. When the output from the CMP 9 is "1" and the output from the CMP 10 is "0", that is, if the value $\delta$ exceeds the threshold value $T_1$ ($\delta > T_1$), the expanded gradation data changed to the maximum value MAX is issued by way of the control buffer $12_2$ and the OR gate. Further, if the output from the CMP 9 is "0" and the output from the CMP 10 is "1", that is, the value $\delta$ is smaller than the threshold value $T_2$ ($\delta < T_2$), the expanded gradation data changed to the minimum value MIN is issued by way of the control buffer $12_3$ and the OR gate.

The gradation data processing apparatus 1a in FIG. 9 can be applied, instead of the gradation data processing apparatus 1 shown in FIG. 1, to the image processing equipment shown in FIG. 3. Accordingly, when the processing apparatus 1a is applied to the image processing equipment as shown in FIG. 3, the CPU 2 performs image processing while properly setting the flow of data such as: scanner 29, which generates data with 16 gradations →gradation data expanding device 1a, which changes data of the scanner into data with 64 gradations →printer 27, scanner 29→frame memory 24, frame memory 24→gradation data expanding device 1a→frame memory 25, MODEM 31 with 16 gradations→frame memory 24→gradation data expanding device 1a→frame memory 25→CRT 21 and the like.

The image processing equipment shown in FIG. 3 including the expanding gradation data processing apparatus 1a can also be constituted as shown in FIG. 4a as described above, wherein the gradation data expanding apparatus 1a is disposed to gradation processing section 102, and the original gradation data with 16 gradations are converted by the expanding apparatus 1a of the gradation processing section 102 into expanded gradation data with 64 gradations. The expanded gradation data are applied with halftone image processing, converted into binary data and applied to the image editing unit 300. In the system shown in FIG. 6, the CPU 50 may prepare expanded gradation data with 64 gradations, using the gradation data of 16 gradations stored in the frame memory 57 as the original gradation data, store the expanded data into the frame memory 56 and print out them by way of the laser printer 61 under the instruction from the system controller 51. The operation of storing the expanded gradation data into the frame memory 56 of the system shown in FIG. 6 will be explained while referring to FIG. 7a and FIG. 10.

In FIG. 7a, the frame memory 56 for 64 gradations is initialized and registers A, B, C, etc. are cleared at S101. Then, from step 102 to step 115, same operations are carried out as described above regarding the 16 gradations. Accordingly, when the step 115 is ended, the value of the equation (2) described above is loaded to the register C.

As shown in FIG. 10, the value of the register C is compared with the first threshold value $T_1$ at S116. In the case if the value of the register C exceeds the first threshold value $T_1$, the step proceeds to S117, the maximum value MAX on 64 gradations is determined as the expanded gradation data $D_{64}$ (p, q) and stored in the frame memory 56 with the address (p, q). In this embodiment, the value of the first threshold value $T_1$ is predetermined to 2 and the maximum values MAX is predetermined to (111111).

If the value of the register C is smaller than the first threshold value $T_1$, the step proceeds to S118, in which the value of the register C is compared with the second threshold value $T_2$. In this case, if the value of the register C is smaller than the second threshold value $T_2$, the step proceeds to S119, in which the minimum value MIN on 64 gradations is determined as the expanded gradation data $D_{64}$ (p, q) and stored to the memory region of the frame memory 56 with the address (p, q). The value of the second threshold value $T_2$ is predetermined to $-2$ and the minimum value MIN is predetermined to (000000) in this embodiment.

At S118, if the value of the register C is greater than the second threshold value $T_2$, that is, the value of the register C is smaller than the first threshold value $T_1$ and greater than the second threshold value $T_2$ ($2 \geq \delta \geq -2$), the step proceeds to S120, in which the value prepared by adding the value of the register A and the value of the register B or by calculation for the equation (1) as described above, is determined as the expanded gradation data $D_{64}$(p, q) and stored in the region of the frame memory 56 with the address (p, q).

When the step proceeds from S117, S119 or S120 to S121, the value of the register q is examined. Since the value of the register q is equal to the number of the small regions in the lateral direction of the original image, if q≠m (q<m), the operation is returned to S112 in the flow shown in FIG. 8a, the register q is incremented by 1, that is the noted small region is shifted rightwardly by 1 and the foregoing processings are repeated. If q=m, since this means that the expanding processing for the $p_{th}$ line has been ended, the value of the register q is cleaned at S122 and the value of the register p is examined at S123. Since the value of the register p is equal to the number of lines in the vertical direction of the original image, if p≠n (p<n), the operation is returned to S111 in the flow shown in FIG. 8a, and the register p is incremented by 1 or shifted downwardly by 1 line and the foregoing processings are repeated from the left end small region. If p=n, since this means that the entire expanding processing of the original image has been ended, the operation is returned to the main routine not illustrated.

Also in the embodiment shown in FIG. 6, quite identical effect with that in the embodiment in FIG. 9 can be obtained.

In the apparatus shown in FIG. 9 and in the system shown in FIG. 6 that operates in the same manner as the apparatus shown in FIG. 9, the original gradation data with 16 gradations are expanded into the gradation data with 64 gradations, but this invention is no way limited only thereto. For instance, expanded gradation data with 256 gradations may be prepared by multiplying the original gradation data with 16 gradations corresponding to the noted small region by the factor of 8 and, adding to the thus multiplied data, the original gradation data corresponding to a small region at the upper left of the noted small region, the original gradation data corresponding to a small region just above the noted small region, the original gradation data corresponding to a small region at the upper right of the noted small region, the original gradation data corresponding to a small region in adjacent to the left of the noted small region, the original gradation data corresponding to a small region in adjacent to the right of the noted small region, the original gradation data corresponding to a small region at the lower left of the noted small region, the original gradation data corresponding to a small region at the just below of the noted small region and the original gradation data corresponding to a small region at the lower right of the noted small region.

As has been described above according to this invention, since the data indicating the maximum value is used as the output gradation data if the deviation between the gradation data corresponding to a noted small region and the gradation data corresponding to a small region adjacent to the noted small region exceeds the upper value of a predetermined range, while the data indicating the minimum value is used as the output gradation data if the deviation goes below the lower value of the range, resolution for a binary image can be increased.

Further, as has been described in the preferred embodiments, since the gradation data is not changed if the deviation lies within the range, the gradation data processing has no effect on the reproducibility of an half-tone image.

Furthermore, according to this invention, since expanded gradation data are determined by performing a weighting compensation for the original gradation data corresponding to the noted small region and the original gradation data corresponding to a small region adjacent to the noted small region, it is possible to reproduce the image with the smooth density change inherent to the half-tone images such as a photograph or a picture, and expanded gradation data with high quality can be easily formed from the original gradation data with lower gradation classification.

Furthermore, as has been described above for the preferred embodiments, by using the data obtained by the weighting addition if the deviation between the original gradation data corresponding to the noted small region and the original gradation data corresponding to a small region adjacent to the noted small region lies within the range, the data indicating the maximum value if the deviation exceeds the upper value of the range and the data indicating the minimum value if the deviation goes below the lower value of the range respectively as the expanded gradation data, smooth gradation expression can be conducted in the portion of the halftone image, while the binary image such as letter can be emphasized in the contour thereof to obtain an image with higher resolution.

What is claimed is:

1. A device for converting gradation data representative of the density level of a picture element of an original scanned image into extended gradation data for use in reproducing the original image, said original image being divided into an array of adjacent picture elements and being line-scanned from top to bottom, said device comprising:

first means for extracting (a) binary gradation data D comprised of a digital word of predetermined length and representative of a selected picture element, (b) binary gradation data Du representative of a pucture element located above and adjacent to said selected picture element, and (c) binary gradation data Dl representative of a picture element located immediately to the side of said selected picture element;

second means for executing the following calculations in order to obtain a binary gradation date D' consisting of digital words having more bits than said gradation data D;

(a) $D' = 2 \cdot D + (Du + Dl)$ when $T_2 < \delta < T_1$;

(b) $D' = D_{max}$ when $T_1 < \delta$; and (c) $D' = D_{min}$ when $\delta < T_2$;

wherein $\delta = 2 \cdot D - (Du + Dl)$, $T_1$ is a first predetermined threshold value, $T_2$ is a second predetermined threshold value smaller than $T_1$, $D_{max}$ is a predetermined maximum gradation value, and $D_{min}$ is a predetermined minimum gradation value; and third means for delivering the calculated binary gradation data D' representative of the density level of the selected picture element as extended gradation data for use in reproducing the original image.

2. The device of claim 1, in which said second means has switch means for adjusting the values of $T_1$ and $T_2$.

3. The device of claim 1, in which said second means has switch means for adjusting the values of $D_{max}$ and $D_{min}$.

4. The device of claim 1, in which the first means includes latch means for temporarily storing said gradation data D, Du and Dl.

5. The device of claim 4, in which said second means has switch means for adjusting the values of $T_1$ and $T_2$.

6. The device of claim 4, in which said second means has switch means for adjusting the values of $D_{max}$ and $D_{min}$.

7. The device of claim 1, in which each of said gradation data D, Du, and Dl is a 4-bit digital signal capable of representing 16 gradation values.

8. The device of claim 7, in which said second means has switch means for adjusting the values of $T_1$ and $T_2$.

9. The device of claim 7, in which said second means has switch means for adjusting the values of $D_{max}$ and $D_{min}$.

10. The device of claim 3, in which said gradation data D' is a 6-bit digital signal capable of representing 64 gradation values.

11. The device of claim 10, in which said second means has swithc means for adjusting the values of $T_1$ and $T_2$.

12. The device of claim 10, in which said second means has switch means for adjusting the values of $D_{max}$ and $D_{min}$.

13. A device for converting gradation data representative of the density level of a picture element of an original scanned image into extended gradation data ofr use in reproducing the original image, said original image being divided into an array of adjacent picture elements and being line-scanned from top to bottom, said device comprising:

first means for extracting (a) binary gradation data D comprised of a digital word of predetermined length and representative of a selected picture leements, and (b) binary gradation data representative of a plurality of peripheral picture elements adjacent to said selected picture elements;

second means for calculating the sum of theb binary gradation data of the plurality of peripheral picture elements;

third means for multiplying the gradation data D by the number of the peripheral picture elements;

fourth means for calculating the total sum of the sum output of said second means and the multiplication product of said third means; and fifth means for (a) delivering said total sum when $T_2 < \delta < T_1$, (b) delivering a first predetermined gradation value when $T_1 < \delta$, and (c) delivering a second predetermined gradation value when $\delta < T_2$, as said extended gradation data for use in reproducing the original image, said extended gradation data being representative of the density level of said selected picture element being comprised of a digital word having more bits than said digital word defining said gradation data D, where $T_1$ is a first predetermined threshold value and $T_2$ is a second predetermined threshold value smaller than $T_1$.

* * * * *